United States Patent [19]

Lou et al.

[11] Patent Number: 5,386,777
[45] Date of Patent: Feb. 7, 1995

[54] ROCKET MOTOR CONSTRUCTION FROM POROUS BINDER CORE

[75] Inventors: Richard L. Lou, Rocklin; Norman Mittermaier, Placerville; George M. Clark, Orangevale, all of Calif.

[73] Assignee: Aero-Jet General Corporation, Rancho Cordova, Calif.

[21] Appl. No.: 833,235

[22] Filed: Feb. 10, 1992

[51] Int. Cl.[6] .......................... C06D 5/06; F42B 33/00
[52] U.S. Cl. ...................... 102/291; 102/347; 86/17; 86/47
[58] Field of Search ............... 86/10, 17, 47; 102/291, 102/349

[56] References Cited

U.S. PATENT DOCUMENTS

| | | | |
|---|---|---|---|
| 4,068,589 | 1/1978 | Oversohl | 264/3.1 X |
| 4,604,248 | 8/1986 | Dehm | 11/11 |
| 4,744,299 | 5/1988 | Sayles | 102/290 |
| 4,911,795 | 3/1990 | Olliff, Jr. | 60/219 X |
| 5,007,343 | 4/1991 | Marks | 102/290 |

*Primary Examiner*—Peter A. Nelson
*Attorney, Agent, or Firm*—Townsend and Townsend Khourie and Crew

[57] ABSTRACT

Rocket motors are constructed by encasing a solid porous poly(vinyl alcohol) core in the shape of the propellant grain with motor casing material in the same manner as motor casing material is conventionally applied over a disposable or removable mandrel. The motor is then completed by filling the open passages of the core with liquid oxidizer. When the liquid oxidizer permeates the poly(vinyl alcohol), the result is a solid continuous propellant grain of rubbery consistency. Aluminum powder may be incorporated in either the porous poly(vinyl alcohol) or the liquid oxidizer to achieve a fuel-enhanced propellant.

52 Claims, 1 Drawing Sheet

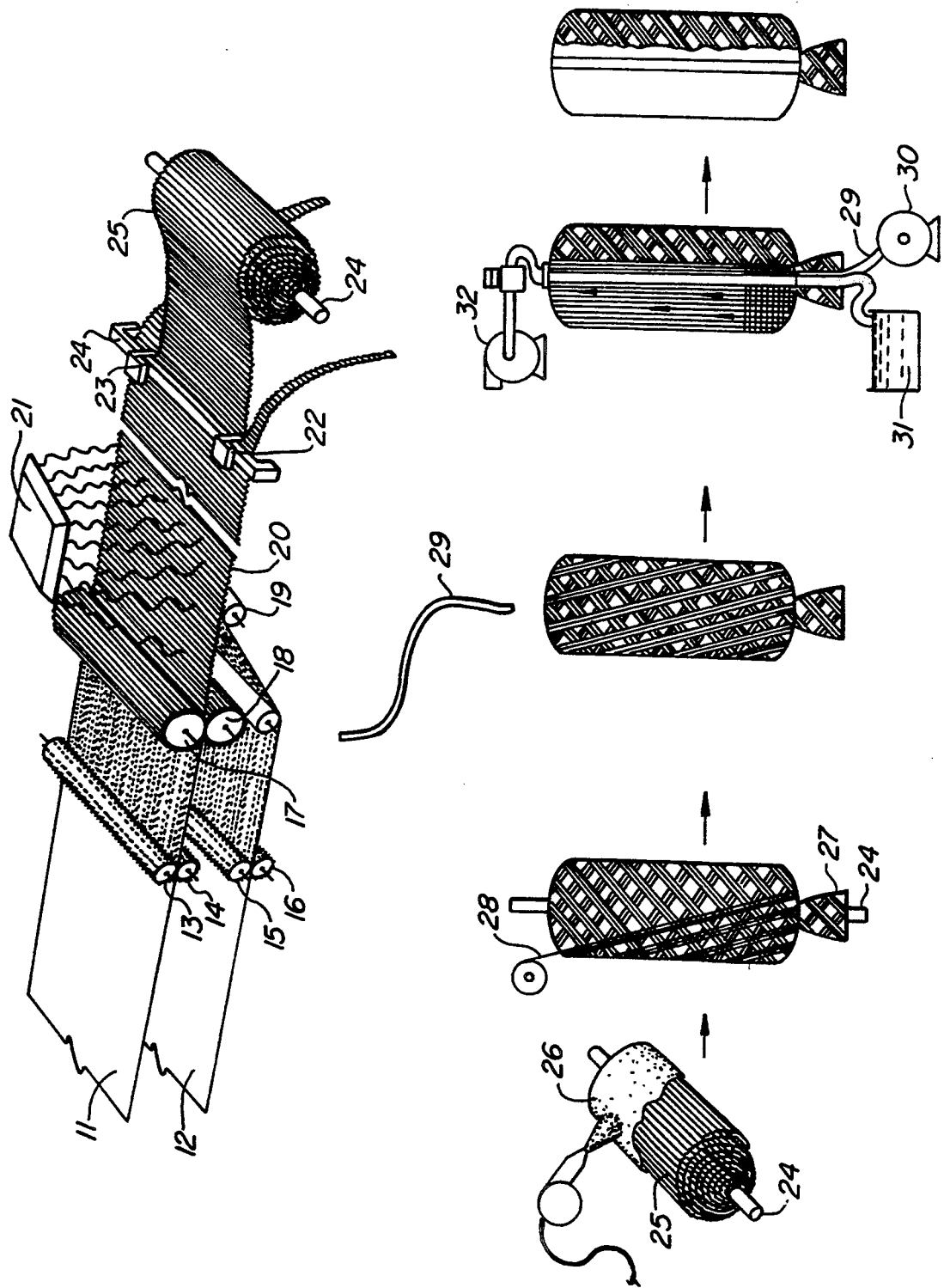

ROCKET MOTOR CONSTRUCTION FROM POROUS BINDER CORE

BACKGROUND OF THE INVENTION

The goals in rocket motor design are a large propulsive impulse and a large impulse-to-weight ratio, while extending the impulse over time to produce the maximum range for a given payload. The propellant must burn in a predetermined geometric pattern at a controlled rate and continue to do so until the propellant is fully consumed, to avoid excessive increases in temperature which might lead to premature explosions or destruction of the motor case. Propellant grains which achieve this most effectively are those which have a rubbery consistency which resists the formation of discontinuities such as cracks in the body of the grain and gaps between the grain and the case wall. Such discontinuities create an explosion danger by increasing the surface area where solid propellant is exposed to the advancing burning front. Burn rate and burn efficiency are also affected by the proportions of the oxidizer, binder and fuel in the propellant grain and by the uniformity of the grain composition. On the whole, therefore, the composition, consistency and shape of the propellant grain, favorable mechanical properties and the means by which the grain is bonded to the motor case are important factors in achieving the safety, reliability and favorable mechanical properties which are desirable in rocket motors.

Conventional methods of fabricating composite case rocket motors begin with the fabrication of the motor case over a mandrel in the shape of the propellant grain, the mandrel being either a disposable structure made of plaster or sand, or an assembled structure which can be dismantled and removed in small size parts. Before the motor case is applied, the mandrel is coated with an insulating material, either by tape-winding or by the use of a premolded form of insulation. Once this is done, the motor case itself is formed by winding the insulation-coated mandrel with filament which is either graphite or polyethylene fiber pre-impregnated with an epoxy resin. The wound filament is then cured to form a solid shell. The mandrel is then removed from the cured shell and replaced with liquid propellant material which is cast and cured in place to form the propellant grain, using a core rod of appropriate configuration to form the center perforation of the grain. Unfortunately, removal of the mandrel is a labor-intensive and costly procedure, and when combined with the numerous other steps and stages in the overall procedure, results in many opportunities for error, damage and loss.

SUMMARY OF THE INVENTION

These and other problems encountered in conventional rocket motor fabrication are addressed by the present invention, according to which the temporary mandrel of the conventional procedures is replaced by a solid core of poly(vinyl alcohol) (PVA) polymer perforated throughout with open passages. The PVA core is then covered with insulation materials and the case shell is applied over the PVA core. The motor is completed by filling the open passages of the core with liquid oxidizer. The liquid oxidizer is permitted to permeate the PVA, causing the PVA to swell and form a continuous solid mass of propellant with a rubbery consistency. The PVA core is formed with an axial passage to correspond to the center perforation of the finished motor, the passage being blocked while the liquid oxidizer is being added and permitted to permeate the PVA.

The substitution of PVA for the aluminum foam of the prior art as a grain matrix has several distinct advantages. For example, aluminum foam is rigid and retains its rigidity even after the voids are filled with the other propellant components such as oxidizer and binder. This results in poor structural integrity and tends to lead to defect formation when the rocket motor is exposed to temperature cycling.

While the perforated PVA core may be formed in a variety of ways, a preferred method is one in which the core is formed from sheets of corrugated PVA interleaved with flat or non-corrugated sheets of PVA, applied in layers over a mandrel or perforation core corresponding in shape to the final axial passage of the rocket motor. A variety of liquid oxidizers may also be used, with preferred oxidizers being either ammonium nitrate, a lower alkylammonium nitrate, a lower alkylhydroxylammonium nitrate, hydroxylammonium nitrate, hydrazinium nitrate, lithium nitrate, or a combination of two or more of these species. Combinations of these liquid oxidizers which remain liquid at temperatures at least as far down as 30° C. are preferred. In further preferred embodiments, fuel is included in the form of small ($11\mu$ to $100\mu$) metallic particles such as aluminum. These metallic particles are included either as a dispersion in the liquid oxidizer or as an additive incorporated into, or applied to the surfaces of, the PVA sheets.

Use of the present invention simplifies the production of a rocket motor considerably, leading to lower cost and improved reliability. The invention also provides a safer process because hazardous operations such as the removal of the perforation core and the mixing of propellant are eliminated. Another safety advantage is that the invention makes it possible to ship a non-hazardous rocket motor (i.e., the motor prior to addition of the oxidizer) to a launch site where the motor can be made operation-ready simply by adding liquid oxidizer in a manner similar to the filling of oxidizer tanks of liquid rockets.

In the case of the preferred embodiments in which the core is formed from corrugated sheets of PVA, one of the unique advantages of this invention is the ability to produce a propellant grain whose composition varies in the radial direction to achieve controlled variation of the burn rate. Control of the burn rate in this manner provides improved system performance since it allows one to use a higher propellant loading, and to achieve a neutral pressure curve with a sharp tail-off. The result is a more efficient use of the propellant, little if any propellant waste, and the ability to design the motor for an optimum operating pressure rather than a peak pressure which may be well above the average operating pressure. Burn rate control can also reduce or eliminate the need for special core tooling to reduce the early exposure of the insulation in the forward and ft domes of the motor case. Methods of applying the invention to achieve radial burn rate variation are described in detail below.

The present invention may also be used to simplify the fabrication of small tactical motors. As in rocket motor fabrication, the small tactical motors are formed from pre-shaped PVA foam or other porous forms of PVA, followed by filling with liquid oxidizer. The process offers advantages of cost, reliability and safety similar to those enjoyed in rocket motor fabrication. As motor size decreases, there is a trade-off between cost and performance, and this frequently justifies the use of prefabricated metal containers as the rocket motor cases, as are the cases in most tactical rocket motors. The present invention may still be used to advantage by inserting preshaped porous PVA structures into the prefabricated case, the porous PVA structures being inserted either as a whole or in sections for ease of fabrication. The processing of the propellant grain is then completed simply by filling the PVA structure with liquid oxidizers.

Further objects and advantages of the invention will become apparent from the description which follows.

BRIEF DESCRIPTION OF THE DRAWING

The drawing attached hereto is a process flow scheme representing one example of how the process of the invention may be used in forming a rocket motor.

DETAILED DESCRIPTION OF THE INVENTION AND PREFERRED EMBODIMENTS

The ability of poly(vinyl alcohol) to absorb liquid oxidizers, and particularly liquid nitrate oxidizers, and upon so doing to swell and form a rubbery mass, is a feature which makes this binder favorable for use in the present invention. Likewise, other polymeric binders which exhibit similar behavior may be used.

For use in the present invention, the PVA is formed into a rigid but porous mandrel having the same shape as the finished propellant grain of the rocket motor. Accordingly, the mandrel will be generally cylindrical with an open axial passage corresponding to the center perforation of the propellant grain. The mandrel will otherwise be foraminous throughout, i.e., perforated with channels or connected pores or passages which can be completely filled with liquid or a liquid slurry containing the remaining constitutents of the desired propellant formulation.

The PVA may be processed in a variety of ways to achieve a coherent rigid yet foraminous body. One example is by machining a block of foamed PVA to the desired shape and dimensions. Another example is by casting the PVA from a liquid solution or prepolymer in a mold with a blowing agent such as ammonium bicarbonate or other well known blowing agents which perform similarly. A third example is by forming layers of PVA around a core mandrel, using porous or perforated sheets of PVA or sheets with indentations or height variations along the surface such that open spaces or passages are formed when the sheets are stacked into layers. Further examples will be readily apparent to those skilled in the art.

A particularly effective technique of forming the mandrel is by using layers of thin sheets of PVA, the layers consisting of corrugated sheets alternating with flat sheets. The flat sheet layers keep the flutes in the corrugated sheet layers open to form passages to be filled by the liquid oxidizer and to allow free flow of the oxidizer between the layers. The individual sheets, both flat and corrugated, may further be perforated with holes distributed over their surfaces to promote fluid flow from one layer to the next in the radial direction.

The void fraction, i.e., the ratio of the open volume inside the channels and pores to the total volume of the mandrel, exclusive of the hollow axial core, will determine the volume ratio of binder to oxidizer in the propellant formulation. Depending on whether a metallic fuel is also included and whether such a fuel is initially incorporated in the PVA, the liquid oxidizer or both, the void fraction will also determine the ratio of binder to fuel or of fuel to oxidizer. Selection of the optimum or most appropriate void fraction for any particular propellant grain will depend on the ultimate properties of the grain and the rocket motor, and are otherwise not critical to this invention. In most applications, however, best results will be achieved with a void fraction of from about 30% to about 90%, preferably from about 50% to about 80%, and most preferably in the vicinity of 67%. In addition, the void fraction can be varied from one layer to the next to produce radial variations such as a radial gradient. Radial variations in the void fraction are one of several means of controlling the burn rate.

In mandrels formed by alternating layers of corrugated and flat sheets, the void fraction can be varied by varying the flute width (or diameter), flute height, or both, of the corrugated layers, varying the sheet thickness of the corrugated sheets, flat sheets or both, varying the ratio of flute diameter to sheet thickness in the corrugated sheets, using multiple plies of either the corrugated sheets, flat sheets or both, or other techniques which will be readily apparent to those skilled in the art. The sheet thickness itself may vary. Best results, however, will generally be achieved with sheet thicknesses in the range of about 0.003 cm to about 0.2cm, preferably from about 0.01 cm to about 0.05 cm.

A convenient method of forming the alternating layers of corrugated and flat sheets is by winding or rolling elongated sheets or webs of the PVA over a core winding rod. According to this technique, the corrugated and flat webs are first layered to form a composite web, which is then wound over the core mandrel until the desired thickness is achieved. The composite may for example consist of one corrugated web and one flat web, or one corrugated web with two flat webs, one on either side.

The corrugated web may be formed from a flat web by passing the flat web through counter-rotating fluting rollers. When it is desired to include perforations in one or more of the webs as well, this may be achieved by passing the webs through counter-rotating perforating rollers. All such rollers may be located in a continuous process line which terminates at the core winding rod.

Since rocket motors generally have dome-shaped ends, the PVA mandrel in accordance with this invention can likewise be formed with domed ends. When the web-winding technique is used, domed ends may be formed by using movable cutters to cut the webs or the composite web along each edge at a point prior to the core winding rod. The distance between the cutters will define the width of the web being wound over the core winding rod and the domes will be formed by narrowing this width in a controlled manner as the winding proceeds. Conventional cutting equipment such as disks or blades may be used, and the spacing between the cutters and the rate at which the spacing narrows may be controlled manually or by automated and/or programmed equipment to achieve the desired dome curvature at each end.

To facilitate the forming of corrugations in a fiat web of PVA, PVA with a moisture content sufficient to impart flexibility to the web may be used. The appropriate or optimum amount of moisture for a web of a particular thickness, density or type of PVA is readily determined by routine experimentation. In most cases, however, a moisture level of about 2% by weight or above, preferably from about 5% to about 20%, or more preferably from about 5% to about 15%, will provide the flexibility needed. Once the corrugations are formed, the moisture content can be reduced to achieve a stiffness adequate to hold the corrugations and to impart structural integrity to the roll as it is being formed over the core winding rod. Once the rolling is complete and the mandrel is fully formed, the moisture content may be further reduced to render the mandrel sufficiently stiff and strong for the filament winding by which the case is applied. Moisture reduction is achieved by conventional techniques, such as a stream of dry gas, particularly warm dry air.

In conventional rocket motor fabrication, an insulating liner is applied between the propellant grain and the external shell of the motor case. Since conventional fabrication procedures utilize a disposable or removable mandrel, the insulation is formed over the mandrel prior to the filament winding to form the shell. In the process of the present invention, insulation of this type may also be included, and may be applied directly over the PVA mandrel after all layers of the PVA have been applied.

While the insulation may serve an insulating function to protect the outer shell, as it does in conventional structures, the need for insulation may be reduced or eliminated by providing the propellant grain with a radially variable burn rate, as indicated above.

The insulation may be formed of material conventionally used for this purpose, and as such will generally be an elastomer. It may be applied in a manner identical to that used with a removable or disposable mandrel, or in a variety of ways, such as rolling, dipping or spraying in the liquid state, followed by curing, which is generally done at ambient temperature.

With the insulation applied and cured, the outer shell of the motor case is applied in a conventional fashion. This is generally done by wrapping the insulation-covered grain with a filament-wound carbon or polyethylene fiber impregnated with epoxy resin. The resin is then cured, generally at a low cure temperature with the use of radiant heat lamps or other conventional heating. At an appropriate point in the fabrication procedure prior to the filament winding, a nozzle is affixed to the PVA core so that the winding is extended to cover the nozzle as well.

Alternatively, the insulated grain can be placed inside a preformed motor case shell by cartridge loading techniques. In a typical technique, the insulated grain is inserted into an open end of a preformed motor case. Once the grain is in position, an end cap containing the nozzle of the motor is secured over the open end to close off the motor and complete the case. This method is useful for small, tactical missiles and is well adaptable to mass production techniques.

The product at this stage is a solid body of foraminous binder encased in a rocket motor case, lacking principally the oxidizer to complete the composition of the propellant grain. Liquid oxidizer is then added while the center perforation through the foraminous binder is blocked so that the liquid oxidizer penetrates the binder only. The addition of liquid oxidizer may be done at the point of use, which permits the encased binder, lacking the oxidizer, to be stored and shipped without any explosion hazard. Addition of the oxidizer to render the motor ready for use is then a relatively simple procedure.

A variety of liquid oxidizers are capable of use in the present invention. Included among these are various inorganic oxidizers known to those skilled in the art, notably perchlorates such as ammonium perchlorate, lower alkylammonium perchlorate, lower alkylhydroxylammonium perchlorate, hydroxylammonium perchlorate, hydrazinium perchlorate, and lithium perchlorate, and nitrates such as ammonium nitrate, lower alkylammonium nitrate, lower alkylhydroxylammonium nitrate, hydroxylammonium nitrate, hydrazinium nitrate and lithium nitrate. These substances are placed in liquid form in a variety of ways, including combining them with solvents or other materials which lower their melting point.

It is preferred, however, to use inorganic nitrate oxidizers in combinations which exhibit eutectic behavior, producing all-liquid mixtures at temperatures in the range or vicinity of ambient temperature.

Some of these combinations are as follows:
 (i) ammonium or a lower alkylammonium nitrate and hydroxylammonium nitrate;
 (ii) hydrazinium nitrate and hydroxylammonium nitrate;
 (iii) ammonium or a lower alkylammonium nitrate, hydrazinium nitrate and hydroxylammonium nitrate;
 (iv) ammonium or a lower alkylammonium nitrate, hydrazinium nitrate and lithium nitrate; and
 (v) a lower alkylhydroxylammonium nitrate and hydroxylammonium nitrate.

The proportions of components used in preparing each combination will be those which lower the melting temperature to a level below about 30° C., and preferably below about 25° C., more preferably below about 20° C., and most preferably below about 10° C., so that the composition remains a homogeneous liquid over the entire range of temperatures which might be encountered during storage, shipping, handling and processing. These proportions are readily determined by routine experimentation well within the expertise of the skilled laboratory technician.

Of the combinations listed above, those involving ammonium or a lower alkyl ammonium nitrate and hydroxylammonium nitrate are preferred. Examples of lower alkyl ammonium nitrates are methylammonium nitrate, dimethylammonium nitrate, ethylammonium nitrate, diethylammonium nitrate, propylammonium nitrate and ethylenediamine dinitrate. The proportions may vary, but best results are usually obtained with combinations in which the ammonium or lower alkyl ammonium nitrate is from about 3% to about 30%, preferably from about 5% to about 15% by weight of the combination.

Blocking or closing off of the axial passage (center perforation) during the oxidizer addition may be achieved by leaving in place the core winding rod over which the layers of PVA were originally formed, followed by subsequent removal of the rod once the liquid oxidizer has fully permeated the binder and the combination has solidified. A preferred method, however, is the replacement of the rod with an inflatable bladder. When pressurized, the bladder fills the entire passage, and pressure is maintained while the liquid oxidizer is added and permitted to solidify. The bladder is then deflated and removed.

With the motor case in the vertical position, the liquid oxidizer may be poured in from the top or drawn upward from the bottom. Addition from the bottom is preferred, to facilitate the complete permeation of all interstices, channels and pores of the binder.

In preferred embodiments of the invention, a metallic fuel is included in the propellant ingredients to form part of the final propellant grain. Examples of metallic fuels are aluminum, zirconium, boron, bismuth and magnesium. Aluminum is preferred. The metallic fuel is most conveniently incorporated as a 5-micron to 60-micron powder. The amount of metallic fuel in proportion to the entire propellant grain may vary, but will generally fall within the range of about 10% to about 40% of the grain on a weight basis. When the metallic fuel is initially incorporated into the PVA mandrel, its proportion of the mixture in the absence of the oxidizer will generally fall within the range of about 40% to about 70% by weight.

Incorporation of the metal powder may be achieved by dispersing the powder in the liquid oxidizer before adding the oxidizer to the encased binder, or by incorporating the powder in the binder as the binder is being formed into the mandrel. For those embodiments of the invention in which the mandrel is formed by applying layers of PVA sheets, or winding a continuous web, over a core rod, the metal powder can be incorporated in the PVA prior to the formation of the sheets or web. Alternatively, the powder may be applied to the surfaces of the sheets or web prior to application to or winding over the core rod. This may be done in a variety of ways which will be readily apparent to those skilled in the art. One example is the dispersion of the powder in a solution of PVA, a thin fill of which is applied over the sheets or web.

For those embodiments in which the metal powder is applied to or incorporated into the PVA prior to winding the sheets or web around the core rod, the proportion of metal powder may be varied to achieve a radial gradient in the finished propellant grain. This may be used as a means for varying the burn rate in the radial direction, as an alternative to the void fraction variation described above.

Other means of varying the burn rate include varying the chemical composition of the PVA as it is being applied in successive layers. This may include varying the molecular weight, incorporating copolymers or derivatives which are similar in structure but with different burn rates, or incorporating additives such as burn rate accelerators or decelerators or combinations of the two. A variety of burn rate accelerators and decelerators are known in the art. Examples are iron oxide and iron blue.

One example of a process within the scope of the invention is illustrated in the drawing. Two webs of PVA 11, 12 are drawn individually through counterrotating perforation rollers 13, 14, 15, 16, and one of the two webs 11 is then drawn through counterrotating fluting rollers 17, 18 to form corrugations. The noncorrugated web 12 is passed over a roller 19 which applies adhesive and draws the two webs together to form a composite web 20. A heat source 21 directs heat to the corrugated web to reduce the moisture content at a point downstream of the fluting rollers.

The composite web 20 is then passed through cutters 22, 23 which are mounted in movable manner on a track 24, and whose spacing varies as the quantity of composite web 20 passing through them proceeds, to form the dome ends. The composite web then proceeds to the core mandrel 24, which it wraps around to form the PVA structure 25 in the ultimate shape of the motor grain.

Once the PVA buildup around the core mandrel 24 is completed, the PVA is covered with insulation 26 which as shown in this drawing is sprayed on, then cured. This is followed by attachment of a nozzle 27 and case winding with the epoxy-impregnated fiber filament 28. The epoxy is then permitted to cure, and the core mandrel 24 is removed. The encased PVA may then be shipped to a use or launch site, where the remaining steps are performed.

At the use or launch site, an inflatable bladder 29 is placed inside the central passage formerly occupied by the core mandrel 24, and the bladder is inflated with pressurized air 30 to completely fill the passage. Liquid oxidizer 31 is pumped up through the PVA by a vacuum pump 32, filling all internal spaces in the motor case not blocked off by the inflated bladder 29. The PVA and oxidizer are then permitted to cure, i.e., the oxidizer is permitted to permeate the PVA to form a solid rubbery mass. Once this is done, the bladder is deflated and removed, and the motor is ready for use.

EXAMPLE

The process scheme illustrated in the drawing was used, using poly(vinyl alcohol) (PVA) of approximately 200,000 daltons molecular weight and 6 mil thickness. Laminae of the film were fluted mechanically to provide sheets with 1/32-inch channels; the centers of the channels were spaced at roughly 37 mil intervals. The fluted PVA and similarly sized sheets of unfluted film of th ye same material were dried overnight at 135° F. (57° C.) to remove most of the moisture. The propellant was prepared by inserting the binder, prepared from alternating sheets of fluted and plane 6 rail PVA film stacked to an appropriate thickness, into a mold of the desired volume containing the amount of oxidizer calculated as necessary for the known weight of binder. The amount of binder employed was, in turn, selected based on the known volume of the mold to be used.

The liquid oxidizer filled the pores of the fluted PVA. After applying a top to the mold to confine the sample, the sample was cured at 135° F. (57° C.) to give the desired minimum smoke propellant. The following table is a comparison of the properties of two propellants prepared using the corrugated binder method vs. a propellant of the same composition prepared by standard mix techniques with powdered PVA.

| Binder | Mechanical Properties, 77° F. | | | |
|---|---|---|---|---|
| | $\sigma_m$, psi | $\epsilon_m$, % | $\epsilon_b$, % | $E_o$, psi |
| PVA Powder | 118 | 425 | 437 | 34 |
| Corrugated PVA (4 mil film) | 111 | 1107 | 1136 | 27 |
| Corrugated PVA (6 mil film) | 108 | 484 | 489 | 48 |

$\sigma_m$: maximum tensile strength
$\epsilon_m$: elongation at maximum stress
$\epsilon_b$: elongation at break
$E_o$: initial tangent modulus (stress/strain)

The foregoing is offered primarily for purposes of illustration. It will be readily apparent to those skilled in the art that the operating conditions, materials, procedural steps and other parameters of the system described herein may be further modified or substituted in various ways without departing from the spirit and scope of the invention.

What is claimed is:

1. A method for the manufacture of a solid propellant-based rocket motor, said method comprising:
    (a) forming a body of solid foraminous poly(vinyl alcohol) in the shape of a propellant grain of a solid propellant-based rocket motor with an axial passage;
    (b) encasing said body of solid foraminous poly(vinyl alcohol) in a solid inert shell;
    (c) with said axial passage blocked, filling the interstitial volume of said body of solid foraminous poly(vinyl alcohol) with a liquid oxidizer; and
    (d) permitting said liquid oxidizer to permeate said poly(vinyl alcohol) and to thereby form a solid continuous mass.

2. A method in accordance with claim 1 in which said body of solid foraminous poly(vinyl alcohol) has a void space of from about 30% to about 3. A method in accordance with claim 1 in which said body of solid foraminous poly(vinyl alcohol) has a void space of from about 50% to about 4. A method in accordance with claim 1 in which said liquid oxidizer is a composition comprising one or more members selected from the group consisting of ammonium nitrate, lower alkylammonium nitrate, lower alkylhydroxylammonium nitrate, hydroxylammonium nitrate, hydrazinium nitrate, lithium nitrate, ammonium perchlorate, lower alkylammonium perchlorate, lower alkylhydroxylammonium perchlorate, hydroxylammonium perchlorate, hydrazinium perchlorate, and lithium perchlorate, selected such that the lowest temperature at which said composition is entirely in the liquid phase is within the range of about 30° C. or below.

5. A method in accordance with claim 1 in which said liquid oxidizer is a composition selected from the group consisting of:
    (i) ammonium or lower alkyl ammonium nitrate and hydroxylammonium nitrate;
    (ii) hydrazinium nitrate and hydroxylammonium nitrate;
    (iii) ammonium or lower alkyl ammonium nitrate, hydrazinium nitrate and hydroxylammonium nitrate;
    (iv) ammonium or lower alkyl ammonium nitrate, hydrazinium nitrate and lithium nitrate; and
    (v) lower alkylhydroxylammonium nitrate and hydroxylammonium nitrate;
the proportion of components in each said composition selected such that the lowest temperature at which said composition is entirely in the liquid phase is within the range of about 30° C. or below.

6. A method in accordance with claim 1 in which said liquid oxidizer is a nonaqueous mixture containing ammonium or lower alkyl ammonium nitrate and hydroxylammonium nitrate, the proportion of said ammonium or lower alkyl ammonium nitrate in said mixture selected such that the lowest temperature at which said mixture is entirely in the liquid phase is within the range of about 30° C. or below.

7. A method in accordance with claim 1 further comprising incorporating metallic fuel particles into said solid continuous mass.

8. A method in accordance with claim 7 in which said metallic fuel particles are incorporated in at least one of said corrugated and non-corrugated sheets of poly(vinyl alcohol).

9. A method in accordance with claim 7 in which said metallic fuel particles are dispersed in said liquid oxidizer.

10. A method in accordance with claim 7 in which said metallic fuel particles comprise from about 10% to about 40% of said solid continuous mass.

11. A method in accordance with claim 1 further comprising coating the exterior surface of said cylindrical body of foraminous poly(vinyl alcohol) with an elastomeric material prior to step (b) to seal all openings therein.

12. A method in accordance with claim 1 in which step (b) comprises:
    (i) winding around said cylindrical body a strip of fiber matrix impregnated with resin; and
    (ii) curing said resin.

13. A method for the manufacture of a solid propellant-based rocket motor, said method comprising:
    (a) combining a corrugated sheet of poly(vinyl alcohol) with at least one non-corrugated sheet of poly(vinyl alcohol) into a composite sheet and winding said composite sheet around a mandrel to form a cylindrical body of foraminous poly(vinyl alcohol) with an axial passage defined by said mandrel;
    (b) encasing said cylindrical body of foraminous poly(vinyl alcohol) in a solid inert shell;
    (c) with said axial passage blocked, filling the interstitial volume of said cylindrical body of said foraminous poly(vinyl alcohol) with a liquid oxidizer; and
    (d) permitting said liquid oxidizer to permeate said poly(vinyl alcohol) and to thereby form a solid continuous mass.

14. A method in accordance with claim 13 in which said poly(vinyl alcohol) in said corrugated and non-corrugated sheets has a moisture content of at least about 2% by weight, and said method further comprises lowering said moisture content by an amount sufficient to increase the rigidity of said poly(vinyl alcohol) between steps (a) and (b).

15. A method in accordance with claim 13 in which said poly(vinyl alcohol) in said corrugated and non-corrugated sheets has a moisture content of at least about 2% by weight, and said method further comprises exposing said cylindrical body of foraminous poly(vinyl alcohol) to a stream of dry gas at an elevated temperature between steps (a) and (b) to lower said moisture content by an amount sufficient to increase the rigidity of said poly(vinyl alcohol).

16. A method in accordance with claim 13 further comprising incorporating metallic fuel particles into said solid continuous mass.

17. A method in accordance with claim 16 in which said metallic fuel particles are incorporated in at least one of said corrugated and non-corrugated sheets of poly(vinyl alcohol).

18. A method in accordance with claim 16 in which said metallic fuel particles are dispersed in said liquid oxidizer.

19. A method in accordance with claim 16 in which said metallic fuel particles comprise from about 10% to about 40% of said solid continuous mass.

20. A method in accordance with claim 13 in which said cylindrical body of foraminous poly(vinyl alcohol) has a void space of from about 30% to about 90%.

21. A method in accordance with claim 13 in which said cylindrical body of foraminous poly(vinyl alcohol) has a void space of from about 50% to about 80%.

22. A method in accordance with claim 13 further comprising coating the exterior surface of said cylindrical body of foraminous poly(vinyl alcohol) with an elastomeric material prior to step (b) to seal all openings therein.

23. A method in accordance with claim 13 in which step (b) comprises:
(i) winding around said cylindrical body a strip of fiber matrix impregnated with resin; and
(ii) curing said resin.

24. A method in accordance with claim 13 in which said liquid oxidizer is a composition comprising one or more members selected from the group consisting of ammonium nitrate, lower alkylammonium nitrate, lower alkylhydroxylammonium nitrate, hydroxylammonium nitrate, hydrazinium nitrate, lithium nitrate, ammonium perchlorate, lower alkylammonium perchlorate, lower alkylhydroxylammonium perchlorate, hydroxylammonium perchlorate, hydrazinium perchlorate, and lithium perchlorate, selected such that the lowest temperature at which said composition is entirely in the liquid phase is within the range of about 30° C or below.

25. A method in accordance with claim 13 in which said liquid oxidizer is a composition selected from the group consisting of:
(i) ammonium or lower alkyl ammonium nitrate and hydroxylammonium nitrate;
(ii) hydrazinium nitrate and hydroxylammonium nitrate;
(iii) ammonium or lower alkyl ammonium nitrate, hydrazinium nitrate and hydroxylammonium nitrate;
(iv) ammonium or lower alkyl ammonium nitrate, hydrazinium nitrate and lithium nitrate; and
(v) lower alkylhydroxylammonium nitrate and hydroxylammonium nitrate;
the proportion of components in each said composition selected such that the lowest temperature at which said composition is entirely in the liquid phase is within the range of about 30° C. or below.

26. A method in accordance with claim 13 in which said liquid oxidizer is a nonaqueous mixture containing ammonium or lower alkyl ammonium nitrate and hydroxylammonium nitrate, the proportion of said ammonium or lower alkyl ammonium nitrate in said mixture selected such that the lowest temperature at which said mixture is entirely in the liquid phase is within the range of about 30° C. or below.

27. A method in accordance with claim 13 further comprising forming said composite sheet and winding said composite sheet around said mandrel in step (a) such that said solid continuous mass formed in step (d) has a variable burn rate which decreases radially through the cross section of said liquid oxidizer-permeated poly(vinyl alcohol).

28. A method in accordance with claim 27 in which said variable burn rate is achieved by a spatial variation in the chemical composition of said poly(vinyl alcohol) of at least one of said corrugated and non-corrugated sheets of poly(vinyl alcohol).

29. A method in accordance with claim 27 in which said variable burn rate is achieved by a variation in the void volume of said cylindrical body of foraminous poly(vinyl alcohol).

30. A method in accordance with claim 29 in which said void volume variation is achieved by varying the number of non-corrugated sheets of poly(vinyl alcohol) used in the formation of said composite sheet in step (a).

31. A method in accordance with claim 29 in which said void volume variation is achieved by varying the ratio of flute diameter to film thickness in said corrugated sheet of poly(vinyl alcohol).

32. A method in accordance with claim 13 in which the thickness of said poly(vinyl alcohol) in both said corrugated and said non-corrugated sheets is from about 0.003 cm to about 0.2 cm.

33. A method in accordance with claim 13 in which the thickness of said poly(vinyl alcohol) in both said corrugated and said non-corrugated sheets is from about 0.01 cm to about 0.05 cm.

34. A method for the manufacture of an encased foraminous propellant binder for combination with a liquid oxidizer to form a solid propellant-based rocket motor, said method comprising:
(a) combining a corrugated sheet of poly(vinyl alcohol) with at least one non-corrugated sheet of poly(vinyl alcohol) into a composite sheet and winding said composite sheet around a mandrel to form a cylindrical body of foraminous poly(vinyl alcohol) with an axial passage defined by said mandrel; and
(b) encasing said cylindrical body of foraminous poly(vinyl alcohol) in a solid inert shell.

35. A method in accordance with claim 34 in which said poly(vinyl alcohol) in said corrugated and non-corrugated sheets has a moisture content of at least about 2% by weight, and said method further comprises lowering said moisture content by an amount sufficient to increase the rigidity of said poly(vinyl alcohol) between steps (a) and (b).

36. A method in accordance with claim 34 in which said poly(vinyl alcohol) in said corrugated and non-corrugated sheets has a moisture content of at least about 2% by weight, and said method further comprises exposing said cylindrical body of foraminous poly(vinyl alcohol) to a stream of dry gas at an elevated temperature between steps (a) and (b) to lower said moisture content by an amount sufficient to increase the rigidity of said poly(vinyl alcohol).

37. A method in accordance with claim 34 further comprising incorporating metallic fuel particles into at least one of said corrugated and noncorrugated sheets of poly(vinyl alcohol).

38. A method in accordance with claim 37 in which said metallic fuel particles comprise from about 40% to about 70% by weight of said corrugated and non-corrugated sheets.

39. A method in accordance with claim 34 in which said cylindrical body of foraminous poly(vinyl alcohol) has a void space of from about 10% to about 50%.

40. A method in accordance with claim 34 in which said cylindrical body of foraminous poly(vinyl alcohol) has a void space of from about 15% to about 40%.

41. A method in accordance with claim 34 further comprising coating the exterior surface of said cylindrical body of foraminous poly(vinyl alcohol) with an elastomeric material prior to step (b) to seal all openings therein.

42. A method in accordance with claim 34 in which step (b) comprises:
(i) winding around said cylindrical body a strip of fiber matrix impregnated with resin; and
(ii) curing said resin.

43. A method in accordance with claim 34 further comprising forming said composite sheet and winding said composite sheet around said mandrel in step (a) such that said cylindrical body of foraminous poly(vinyl alcohol) has a variable burn rate which decreases radially through the cross section of said liquid oxidizer-permeated poly(vinyl alcohol).

44. A method in accordance with claim 43 in which said variable burn rate is achieved by a spatial variation in the chemical composition of said poly(vinyl alcohol) of at least one of said corrugated and non-corrugated sheets of poly(vinyl alcohol).

45. A method in accordance with claim 43 in which said variable burn rate is achieved by a variation in the void volume of said cylindrical body of foraminous poly(vinyl alcohol).

46. A method in accordance with claim 45 in which said void volume variation is achieved by varying the number of non-corrugated sheets of poly(vinyl alcohol) used in the formation of said composite sheet in step (a).

47. A method in accordance with claim 45 in which said void volume variation is achieved by varying the ratio of flute diameter to film thickness in said corrugated sheet of poly(vinyl alcohol).

48. A method in accordance with claim 34 in which the thickness of said poly(vinyl alcohol) in both said corrugated and said non-corrugated sheets is from about 0.003 cm to about 0.2 cm.

49. A method in accordance with claim 34 in which the thickness of said poly(vinyl alcohol) in both said corrugated and said non-corrugated sheets is from about 0.01 cm to about 0.05 cm.

50. A binder-filled motor case for use in forming a solid propellant-based rocket motor by addition of a liquid oxidizer, said binder-filled motor case comprising a body of solid foraminous poly(vinyl alcohol) in the shape of a propellant grain of a solid propellant-based rocket motor with an axial passage, encased in a solid inert shell.

51. A binder-filled motor case in accordance with claim 50 in which said body of solid foraminous poly(vinyl alcohol) has a void space of from about 30% to about 90%.

52. A binder-filled motor case in accordance with claim 50 in which said body of solid foraminous poly(vinyl alcohol) has a void space of from about 50% to about 80%.

* * * * *